United States Patent [19]

Dijkstra

[11] 4,047,243

[45] Sept. 6, 1977

[54] SEGMENT REPLACEMENT MECHANISM FOR VARYING PROGRAM WINDOW SIZES IN A DATA PROCESSING SYSTEM HAVING VIRTUAL MEMORY

[75] Inventor: Edsger W. Dijkstra, Nuenen (NB), Netherlands

[73] Assignee: Burroughs Corporation, Detroit, Mich.

[21] Appl. No.: 581,161

[22] Filed: May 27, 1975

[51] Int. Cl.² .................... G06F 7/00; G06F 13/00; G11C 9/06
[52] U.S. Cl. .................................................. 364/200
[58] Field of Search ................. 340/172.5; 444/172.5; 445/1

[56] References Cited

U.S. PATENT DOCUMENTS

| 3,624,616 | 11/1971 | Patel | 340/172.5 |
|---|---|---|---|
| 3,670,307 | 6/1972 | Arnold et al. | 340/172.5 |
| 3,675,215 | 7/1972 | Arnold et al. | 340/172.5 |
| 3,806,883 | 4/1974 | Weisbecker | 340/172.5 |

*Primary Examiner*—Melvin B. Chapnick
*Attorney, Agent, or Firm*—Mervyn L. Young; Kevin R. Peterson

[57] ABSTRACT

A data processing system with virtual memory and the ability to vary the program window size for each program to be processed. The system includes at least one processor, a main memory, a secondary storage and a channel to handle data transfer between the secondary storage and main memory. Each processor is provided with means to measure the processing time of the processor and the data transfer time of the channel for transferring either variable segments or fixed pages from the secondary storage to main memory in response to page faults. A program table is provided in the processor to contain names of pages which reside in main memory for the current program, which table implements a page replacement mechanism such that as new pages are transferred to main memory for the current program, the least recently used pages are removed therefrom. Each word location of the program table is provided with a counter or register to record the average time duration between virtual faults for that word location where a virtual fault is that incident which would be an actual fault if the program window size contained only that number of page frames. This in turn allows for variation of the current program window size to increase or decrease the number of page faults occurring for the current program in accordance with the ratio of the computation time to data transfer time being significantly greater than or less than one respectively.

1 Claim, 5 Drawing Figures

SEGMENT REPLACEMENT MECHANISM FOR VARYING PROGRAM WINDOW SIZES IN A DATA PROCESSING SYSTEM HAVING VIRTUAL MEMORY

BACKGROUND OF THE INVENTION

1. Field of the Invention

This invention relates to a data processing system having virtual memory and more particularly to such a system and the method employed therein for varying the program window size in main memory for each program being processed by the system.

2. Description of Prior Art

A hierarchical memory system may be formed which employs a high-access-speed low-capacity memory as a main memory and a low-access-speed high-capacity memory as a secondary store. The main memory once was a core memory and now is usually an integrated circuit memory. The secondary store or memory may also be a core memory, a disk memory, or a magnetic bubble memory and the like. The purpose of the main memory is to provide appropriate transfer rates to and from a processing module with data and other information being transferred from the secondary store or memory to the main memory as required. A virtual memory system may be created by providing a hierarchical memory system with the ability to automatically transfer requested information from the secondary store to main memory when that information does not reside in main memory at the time of its request. In this manner, the user is not aware of any inherent limitations due to the size of the main memory.

The advantage of a virtual storage implementation is that not all of the stored information, either program or data, needed for the progress of the computation is required to be stored in main memory simultaneously, but that for large periods of time, parts of the stored information may reside in the secondary store. For this purpose, the information is partitioned into a number of segments such that, during the progress of the computation, the information of a segment will either be totally present in, or totally absent from, the main or primary store. If all the segments have the same size, they are generally referred to as pages, in which case the primary store is then subdivided into so-called page frames which are units of the store able to contain exactly one page.

In a virtual memory system, demand paging is provided so that computation can proceed at its full rate until an access to an absent page is required. Such a requirement is called a page fault and the computation causing the page fault is halted until the needed page can be brought into the primary store from the secondary store. As new pages are brought into the primary store, other pages, already present in the primary store when the page fault occurred, must be sent back to the secondary store in order to make room for new pages. The number of pages or page frames provided in primary store for any given program is defined for the purpose of the present invention as the program window size.

Different programs, different processes within a given program, or even the same process with different data may require different program window sizes. Some processes may require a few number of instructions which are often recalled and other processes may require long strings of instructions. Some processes may require rather small amounts of data for a time while other processes may require large amounts of data at a given time. If a single program window size were provided for all processes of the program, some processes would have lesser throughput than others due to a large number of page faults each requiring that the process be halted until the new pages were brought into the primary store. Thus, a varying program window size should be provided to optimize processing throughput.

In a typical virtual storage implementation, a data transfer channel is provided to transfer pages between the secondary and primary stores and, during the computation time for a given process, the channel and the processor compete for access to the primary store in an interleaved manner. When a page fault occurs during a given process, the processor module is halted until the new page can be brought in. This results in a certain amount of inactivity for the processor module. However, should a given process encounter a relatively small number of page faults, then the processor module would be operating most of the time while the data transfer channel would be idle much of the time. Therefore, in order to utilize both the processor and the channel as much as possible, it would be desirable to adjust the program window size so there would be just enough page fault occurrences such that, during a given portion of process running time, the data channel transfer time would be equal to the processor's computational time. In a multiprogramming mode, the processor would be free to turn to a separate program or process while the channel is bringing in new pages in response to a page fault for the current program. Similarly, the data channel would be occupied with transferring pages for other processes while the processing module is active with a given process not having an abnormally high number of page faults.

It is, then, an object of the present invention to provide a data processing system having an improved virtual storage system.

It is another object of the present invention to provide a data processing system with virtual memory system wherein the program window size for various programs can be varied to minimize an unduly large number of page faults.

It is still another object of the present invention to provide a data processing system with a virtual memory system wherein the number of occurrences of page faults can be adjusted to optimize both the processor's computational time and the data channel's transfer time so as to improve the flexibility of scheduling and the throughput of the data processing system.

SUMMARY OF THE INVENTION

In order to implement the above objects of the present invention, a data processing system is provided with at least one processing module, one main memory module, a secondary storage unit, and a data transfer channel to handle data transfer between the secondary storage and the main memory. The processing module is provided with a program window table in the form of a series of registers in which is stored information about what program pages exist in main memory in the program window for the program currently being run. The table also keeps track of the order in which each of the page frames were last accessed and also the average duration between virtual faults for each of the page frames. The processing module is provided with a real-time clock or counter to measure the time durations during which the processor was doing processing between page faults. The time duration when the channel is transferring data from the secondary store to main memory can be computed from the measured number of faults or can be counted by a real-time clock. Periodically, these two time durations are compared. If the computation time greatly exceeds the data transfer time, then the program window table for the program currently being run is examined to determine what program window size would have a higher frequency of page faults and the program window size is shortened accordingly to increase the number of page faults and, thus, increase the data transfer time of the channel. If the data transfer time greatly exceeds computer time for the current program, the program window table for that program is examined to determine what window size has a lower frequency of page faults and the program window is increased accordingly to decrease the number of page faults and, thus, decrease the data transfer time of the channel.

BRIEF DESCRIPTION OF THE DRAWINGS

The above and other objects, advantages, and features of the present invention will become more readily apparent from a review of the following specification when taken in conjunction with the drawings wherein.

GENERAL DESCRIPTION OF THE INVENTION

Figure 1:
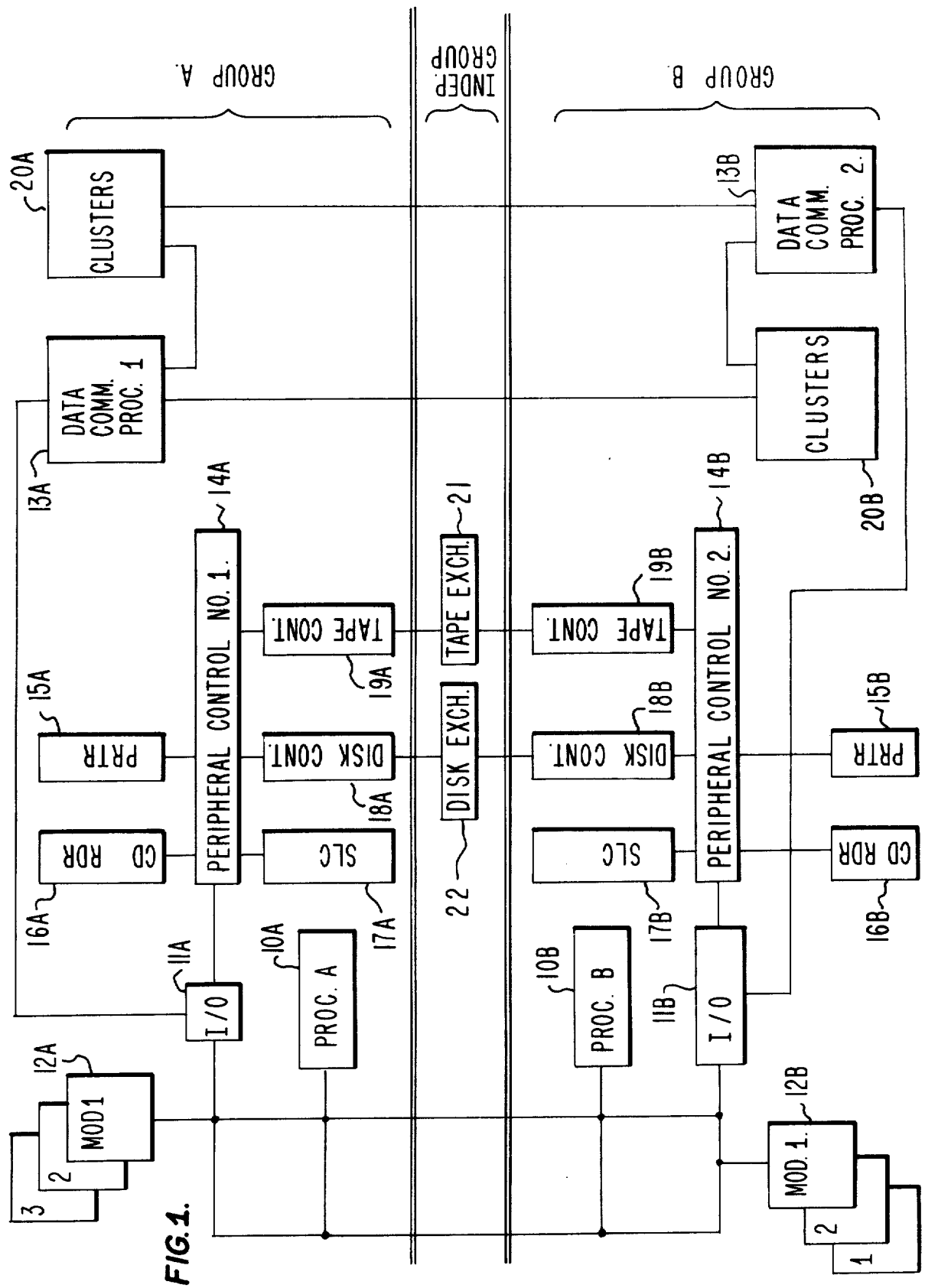
FIG. 1 is a schematic diagram of a data processing system employing the present invention.

While the system of the present invention may employ a single processor system which is nevertheless adapted for multiprogramming modes, the system may also be a multiprocessing system of the type disclosed in FIG. 1. As illustrated therein, the system comprises two processing groups that may be operated either separately or jointly. In this embodiment, the two processing groups are interconnected such that either of the processors 10A, 10B and I/O control units 11A, 11B can access any of the memory modules 12A, 12B. Furthermore, remote terminals can be coupled to clusters 20A, 20B which in turn served to connect those remote terminals to either of data communication processors 13A, 13B and hence to the memory modules. Also, the respective disk control units 18A, 18B are coupled by disk exchange unit 22 to one or more head per track disk files (not shown) and the tape controls 19A, 19B are coupled by way of tape exchange unit 21 to corresponding tape units (not shown). The disk files coupled to disk exchange 22 serve as the secondary storage to main memory modules 12A, 12B to form the virtual memory system of the present invention. Disk exchange 22 in turn is coupled to both disc controllers 18A, 18B and then to I/O channels 11A, 11B by way of peripheral controlled units 14A, 14B respectively. Also coupled to the peripheral control units 14A, 14B are printers 15A, 15B; card reader 16A, 16B and single line control units 17A, 17B, the latter of which drive video display units on the respective operator consoles (not shown).

In the system of FIG. 1, the respective processors, secondary stores and I/O channels are chosen for their performance characteristics. Specifically, the secondary store is preferably a head per track disk such that the location of information in the secondary store does not influence decisions to change the contents of the primary store or main memory 10A, 10B, i.e., that a page access in the secondary store can be regarded as a random access. Furthermore, the processor speed is sufficiently slow, or else the cycle time of the primary (main) store is sufficiently small, or else the transfer rate between the primary and secondary store is sufficiently slow, and so forth, (or any or all of these conditions) such that any slowing down of the processor as a result of cycle stealing by the channel can be ignored. It is also preferred that data transfer between the second and primary stores be handled by a single dedicated channel, i.e., one of the I/O channels 11A, 11B is dedicated specifically to data transfer between disk and main memory.

Two mechanisms are employed in the present invention to optimize the performance of the virtual memory of the system. These are the page replacement mechanism and the adjustment of the program window size. It is the function of the page replacement mechanism to try to reduce, with a given window size, the number of page faults caused by that program and therefore the total amount of time the channel is busy for the benefit of that program. For this purpose, consideration is given both to the total time C that the processor has performed computation for that program and also the total time T that the channel has been occupied with transfers between storage levels as a result of page faults caused by that program. Both times C and T are recorded for that program over the same real-time period. The ideal window size for each program then would be one that would give rise to the ratio $C/T = 1$, i.e., the window size that would cause, on the average, equal demands on processor time and channel time such that the processor and the channel can be scheduled as a single resource. The result of demand paging is that the processor is of no use to the program during the period of time that the channel is busy and the channel is of no use to the program while the processor is busy. Therefore, no program can occupy more than 50% of this combined resource. With a virtual memory system, the degree of multiprogramming (number of programs simultaneously being run) should then be at least two or higher in order to efficiently use the system.

Consider a situation where a program generates its page faults, when executed by itself, quite regularly one at a time while another program, under the same circumstances, generates two page faults at a time with half the frequency of bursts. The combination would not fit into the system and both the processor and the channel would be busy for at most 80% of the time. With a third program (of either type) full occupation is possible and an arbitrary program can use the maximum 50% of the combined resources. The typical purpose of multiprogramming, as far as utilization of active resources is concerned, is to absorb the bursts in which programs may generate page faults.

In the present invention, variations in the page fault generation pattern are corrected by adjusting the program window size, i.e., the number of page frames in main memory allocated to that program. Each program window reconsideration and possible adjustment should only take place with a frequency which is an order of magnitude smaller than that of the target frequency of page fault generation. However, that frequency should be an order of magnitude smaller than the frequency of memory requests that result in a page fault. Conversely, the time duration between page faults should be greater than the transmission time required of the channel for a single page fault. In the present invention, the program window size is reconsidered when the sum of the computation time C and the channel transmission time T is an amount at least 20 times the time duration required for a single page fault transmission. If, since the previous reconsideration of the window size, the computation time C has increased much more than channel transmission time T, a smaller window might be more adequate. If T has increased much more than C, a larger window might be more adequate.

A simple negative feedback circuit to respond to the quotient of C and T would not be efficient because even if our replacement mechanism is such as to indicate that a larger window size would never lead to more page faults, the program might nevertheless be such that a larger window size would not lead to fewer page faults either. It is not enough to know the C/T ratio caused by the current window size but to know it for other sizes as well. With the present invention, "virtual" page fault frequencies and/or durations between virtual page faults are recorded for a number of different window sizes. Thus, when the program window is adjusted, it can be adjusted by the appropriate number of page frames as required to bring the computation time C and the channel transmission time T into more equal proportions.

The management of the frames within any given program window is provided by the replacement mechanism which selects those pages that are to be replaced by the invoked page fault. The replacement mechanism selects the page to be dumped according to the order of the least recently used pages. Such a mechanism can then be said to be monotonic which would not be the case for a random selection or for a first in-first out selection of pages. As defined in the art, a replacement mechanism is monotonic if, at all times, all pages contained in a smaller window will also be contained in the larger window, provided that this was true in the beginning. As a result, in the computation with a larger window, no page fault occurs which does not occur in computation with smaller windows. If a program is executed with a monotonic replacement mechanism and an actual window size W, there can be determined how many page faults would have occurred if the window size had been W + 1, W + 2, . . . up to some maximum. In the present invention, there is recordation of average durations between page faults that would have occurred with window sizes smaller than the current window as well as the number of page faults corresponding to larger window sizes. When plotting page fault frequency against window size, it is not uncommon that the curve has very sharp bend or knee such that for a program with a given window size W, the ratio C/T will be greater than 1 while with a window size W−1, the ratio C/T will drop to something close to zero. With a simple feedback mechanism, the window size adjustment would lead to "thrashing" half of the time with no stable adjustment of the window size. With the additional feature of the present invention for the counting of virtual page faults that would have occurred with window sizes smaller than the actual one, the thrashing is easily avoided.

The present invention is implemented at a number of levels. At the lowest level, the individual memory access is denoted for the sake of the replacement mechanism and a test is made as to whether that access causes a virtual or actual page fault.

At the next level of the present invention, the system denotes actual page faults which occur several orders of magnitude less frequently than the above-referred to memory accesses. Taken in isolation, these page faults only influence the program in which they occur.

At a third level, but again of an order of magnitude less frequently, the window size is reconsidered and a decision is made as to whether the program window size should be increased, decreased, or left unchanged.

At the last level, but again at a lower frequency, changed window sizes are considered as to whether they have influenced the degree of multiprogramming, i.e., larger window sizes may force load shedding while smaller window sizes can allow an increase in the degree of multiprogramming.

DETAILED DESCRIPTION OF THE INVENTION

As illustrated in FIG. 1, the principal resources involved in the present invention include main memory modules 12A or 12B, the disk file coupled to disk exchange 22 of I/O control unit or channel 11A or 11B and processors 10A or 10B. In the practice of the present invention, one of the I/O control units 11A or 11B is dedicated to the control of data transfer between the disk file and one of the main memory modules, where it competes for access with one or both of processors 10A or 10B. Also illustrated in FIG. 1 are printers (PRTR) 15A and 15B and card readers (CD RDR) 16A and 16B. The present description will consider only the single processor case. However, it will be understood that the present invention can be employed with a multiprocessing system.

Figure 2:
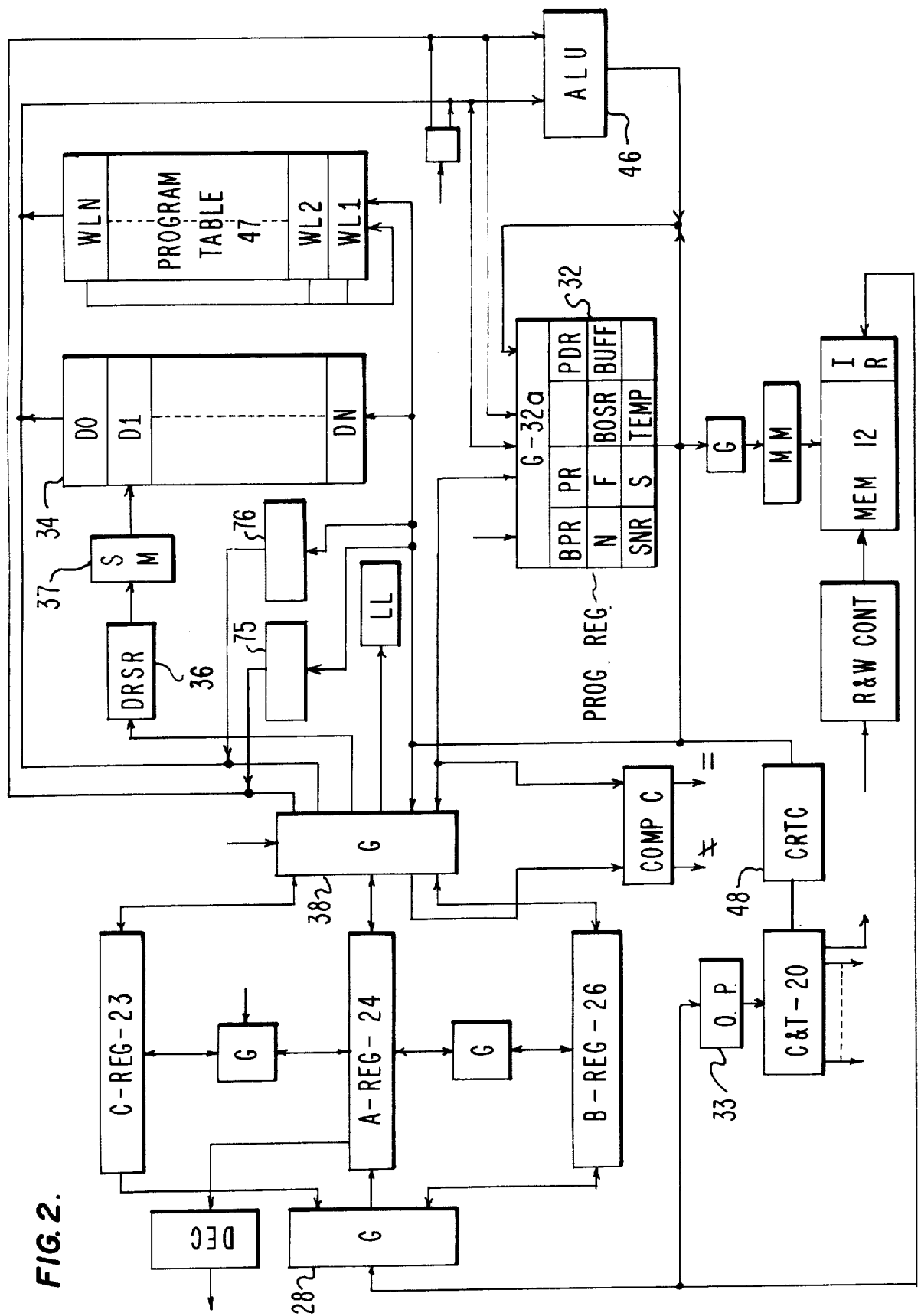
FIG. 2 is a schematic diagram of a processor module of that system.

A processor of the type that may be employed with the present invention is illustrated in FIG. 2. Such a processor and its various gating circuits are specifically described in Macon et al U.S. Pat. No. 3,359,544; Barton et al U.S. Pat. No. 3,546,677 and Barton et al U.S. Pat. No. 3,548,384 which patents are hereby incorporated by reference. Therefore, the specific details of FIG. 2 will not be disclosed except as provided below to describe the features of the present invention. Although it is not required to be, this processor may be stack oriented and the stack mechanism includes A register 24 and B register 26 together with a group of storage locations in memory 12A or 12B of FIG. 1. F and S registers in the group of program registers 32 store addresses for memory locations in main memory and are used in keeping track of the memory locations being used as a stack. A and B registers 24 and 26 respectively form the top two storage locations of a stack and are time shared between information stacks. Information is put in A register 24 and transferred down to the B register and thn transferred down from the B register 26 to the corresponding storage location for the respective stack in memory 12A or 12B by way of gate 28 under control of control and timing unit 20. Information is brought back out of the stack in reverse order and taken out of the top of the current stack by B register 26. The information in the rest of that stack is effectively pushed up one position by appropriately changing the content of the S register contained in the group of program registers 32. The contents of the S register point to the top of the current stack.

Operators for execution by the processor are stored in operator register 33 which is coupled to control and timing unit 20 for use in controlling the sequence of operations of the system. Operators are obtained from memory 12A or 12B and stored in operator register 33 under control of the PR register in the group of program registers 32. The processor also includes a group of display registers 34 which are referenced in FIG. 2 by the symbols DO, . . . , DN. Each of the display registers 34 contains an absolute address of a memory location in memory 12A or 12B which absolute address references a Mark Stack Control Word (MSCW) that is stored at the beginning of each block of storage in the stacks contained in memory 12A or 12B.

Associated with the display registers 34 is a selection matrix 37 and a Display Register Selection Register (DRSR) 36. A lexicographical level 11 value is stored in the DRSR register and designates a particular display register. Selection matrix 37 is responsive to a lexicographical level 11 value contained in register 36 to provide a signal causing the contents of the corresponding display register to be read out of one of the group of display registers 34. Arithmetic Logic Unit (ALU) 46 is provided to create the sum of the contents of one of the display registers 34 and contents selected from among A register 24, B register 26, or C register 22 to form an absolute memory address to thus access any location in any one of the corresponding blocks of storage in a particular stack. Also shown in FIG. 2 are elements which will not be described such as address decode register DEC, lexicographical level register LL, various gating circuits G, read-write control R & W CONT and memory address register MM.

In order to implement the present invention, the processor module of FIG. 2 is also provided with real-time counter or clock (CRTC) 48 that is coupled to control and timing units 20, which counter maintains a running account of the total time duration during which the processor is in a running mode. Such a real time counter may be just a binary counter such as described in Burroughs Corporation, Digital Computer Principles, McGraw-Hill 1962 at pages 291–307, which counter is driven by the processor clock during the processor running mode. Also illustrated in FIG. 2 is program table 47 that is provided to keep track of the number of page frames currently designated to serve the present program, the average time duration between virtual page faults for each page frame and the order in which each of the page frames was last accessed. Whenever the processor is halted because of a page fault, the contents of counter 48 are transferred to accumulator register 75 associated with program table 47 and the counter 48 is reset when the processor again switches to a running mode.

Figure 3:
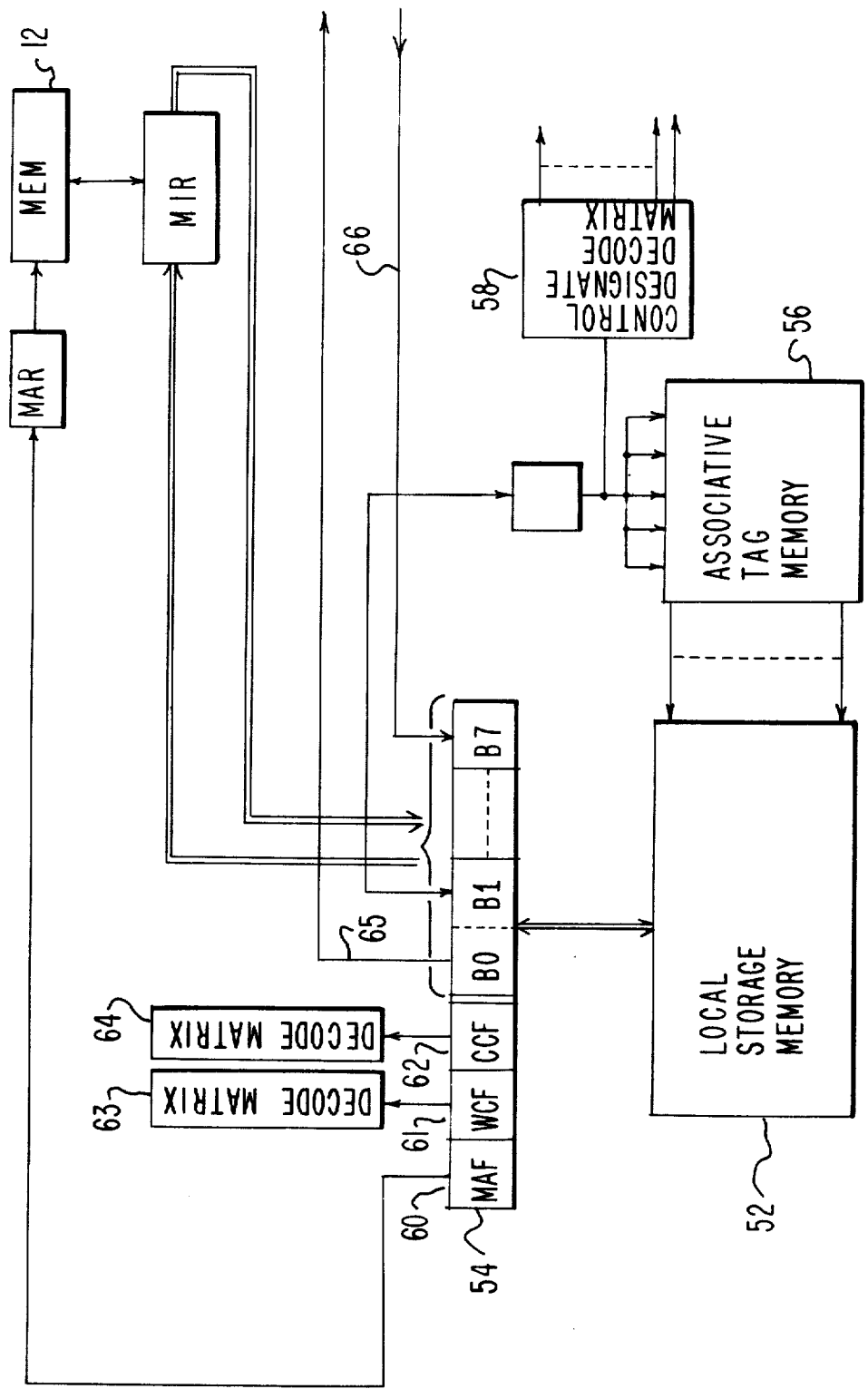
FIG. 3 is a schematic diagram of an I/O control unit of that system.

Before describing the manner in which program table 47 of FIG. 2 is employed in the adjustment of program window sizes, a brief description will be provided of the I/O channel employed with the present invention. A typical I/O control unit for the system of FIG. 1 is illustrated in FIG. 3. Such an I/O control unit and its respective gating are described in detail in the Hauck U.S. Pat. No. 3,408,632 and Hauck et al U.S. Pat. No. 3,639,909 which patents are hereby incorporated by reference and such an I/O control unit will not be described in detail except as provided below. This I/O control unit is, in actuatlity, a multiplexing unit to receive data over a number of input/output buses from various peripheral devices and also the disk file coupled to disk exchange 22 of FIG. 1. While the control unit of FIG. 3 is a multiplexing unit, it will be understood that such a unit could be provided especially for the controlling of data transfer between the disk file secondary store and main memory or at least that one of the input/output buses of the multiplexer could be dedicated to service such data transfer.

In FIG. 3, data words are transferred between memory 12 and storage buffer register 54 and local storage buffer memory 52. Local storage buffer memory 52 is desigend to hold a number of control words to handle current data transfer. The format of each control word is illustrated by the fields in storage buffer register 54 and, in addition to eight data bytes, BO, . . . , B7, the control word includes memory address field 60, word count field 61, and control count field 62.

As illustrated in FIG. 3, data byte B1 of the data word is employed to address associative tag memory 56 which, in turn, selects the next word to be fetched from local storage buffer memory 52. Data byte B1 also activates the control designate decode matrix 58 to select which peripheral device is to be actuated to receive or transmit data for the next data transfer transaction. Data is transferred from storage buffer register 54 to the selected peripheral device by way of output bus 65 in a serial-by-byte manner. To this end, as each data byte is transferred from byte field BO to the peripheral device and the succeeding bytes are shifted to the left in FIG. 3 so that all data byte transfer from storage buffer register 54 emanates from the BO byte field. Similarly, data transfer from the peripheral device to storage buffer register 54 is by way of input bus 66 in a serial-by-byte manner to supply the individual bytes to byte field B7 of storage buffer register 54. As succeeding data bytes are transferred to byte field B7, the previous bytes in that field are shifted to the left. During data transfer between storage buffer register 54 and main memory 12, memory address field 60 is employed to address memory 12 while word count field 61 and control count field 62 are decoded by the decode matrices 63 and 64 respectfully. Also shown in FIG. 3 is memory information register MIR which supplies data to or from memory 12.

Program table 47 of FIG. 2 is illustrated in detail in FIG. 4 and will now be described so as to illustrate the manner in which the program frames of the current program window are managed. As was described above, as new pages are brought into the current program window, some other pages must be dumped or sent back to the secondary storage. The replacement mechanism to accomplish this was described above as a least recently used (LRU) mechanism which is monotonic. It will be appreciated that other mechanisms may be monotonic and also employed in the present invention.

Program table 47 may be just a scratch pade memory or a queue of registers. However, it is preferably made up of a plurality of shift registers so as to appear to be a queue or pull-down stack that nevertheless may be randomly accessed. Program table 47 contains a number of word locations up to the maximum number of frames that may be assigned to any program window. Each word location is made up of an A input field 72 and B input field 73, which will be more thoroughly described below.

Each time a program page is transferred from the secondary storage to main memory, its corresponding program table word is entered into program table 47 at word location number 1 with the previous program table word stored in location 1 being transferred to word location 2, and so forth. Each time a program page is accessed in main memory, the respective table words are checked to see if that page is currently in the program window assigned to the current program. If there is a program table word for that page in the program table, the respective page is accessed and its corresponding program table word is withdrawn from its location in the program table and reentered into the program table at location 1. The remaining program table words that were entered into the program table prior to the currently accessed program words are moved to the next succeeding locations in the program table respectively. In this manner, an order is established in the program table by which the more recently accessed program table words will be correspondingly nearer to the beginning of the table while the less recently accessed program table words will be moved to the far end of the table. Should a page access be requested when the page does not exist within the program window, a page fault occurs which requires a new page to be transferred to main memory and, with the replacement mechanism of the present invention, the least recently used program table word is dumped from program table 47 and its corresponding page is transferred from main memory back to the secondary storage or else simply dumped from memory. This replacement mechanism is said to be monotonic in that had the program been executed with a larger window, that window will nevertheless contain those pages that are in the smaller program window. Correspondingly, the page faults which occur with a larger program window will be a subset of the page faults which occur with the smaller program window.

Figure 4:
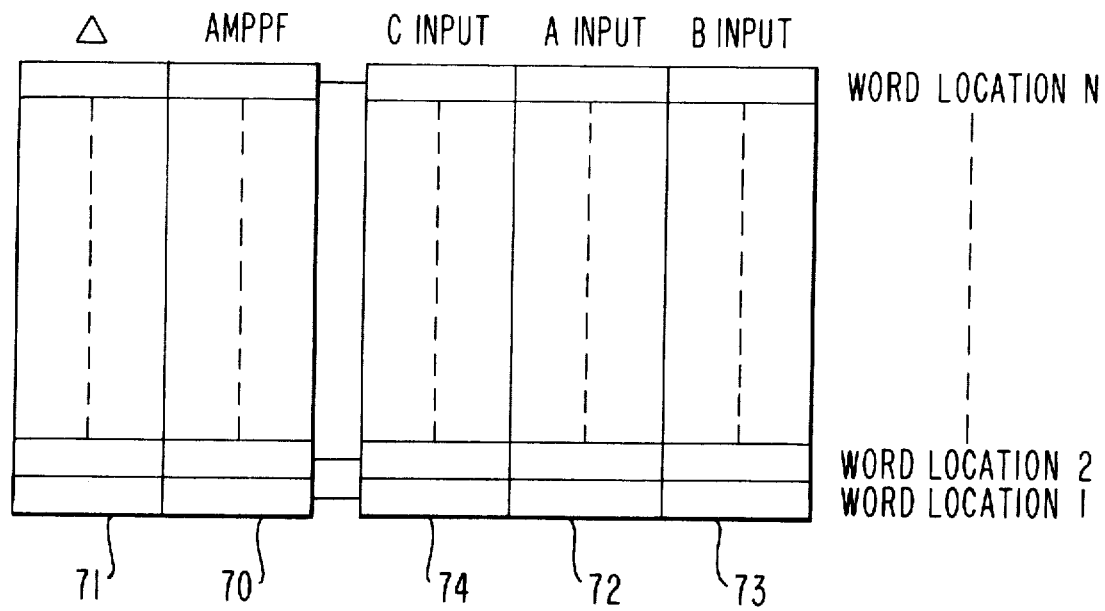
FIG. 4 is an illustration of a program table memory as employed in the present invention.

With the implementation of the replacement mechanism as illustrated in FIG. 4, the existence of a program page in the program window is detected by a presence/absence detection mechanism which is provided with every processing system employing virtual memory. As an alternative, a separate associative memory may be coupled to the A fields of the program table for this purpose.

When a page has been accessed, its program table word is withdrawn from the program table and is reinserted therein at word location 1. At this time, the page designation for that page is entered into both the A input field 72 and B input field 73 of word location 1. As the respective program table words move up the table, the output of each word location becomes the input to the succeeding word location. B input field 73 for each word location always receives the designation or name of the page that is to be accessed.

As indicated in FIG. 4, each word location of the program table is provided with "an average time duration between faults" (delta) field 71 which fields are implemented as a plurality of registers each of which is also provided with a corresponding "AMPPF" register 70 that is more thoroughly described below and also a C input field 74. It will be remembered that, for word locations farther up the table from the word location containing the program table word for the page currently being accessed, there will be no transfer of program table words. During each page access, the contents of the respective register 70 and 71 will be adjusted so that the contents of register 71 represent the average time duration between page fault occurrences that would have occurred if that word location represented the last page frame in the current program window. That is to say, if any word location in the program table represented the last page frame in the current program window, then the transfer of a program table word out of that word location would indicate that the requested page does not exist in that program window and a page fault would have occurred.

The average time duration, delta ($\Delta$), is calculated as an average over a number of time intervals, e.g., eight, between virtual page faults for each word location of the table. The larger the time period over which the average takes place, the more the past history of page fault generation will be reflected. For shorter time durations, there will be more inconsistency or discontinuity that will exist in measuring page fault frequencies.

In FIG. 4, the C input is just the contents of the "program clock," the clock that runs when the current program is executed. This input is supplied first to word location 1 and then to each successive word location that experiences a virtual page fault, i.e., its page designation or name is shifted to the next higher word location to make room for a more recently accessed page name in accordance with the above described replacement mechanism. The "AMPPF" field 70 for each word location represents an "average moment of previous page faults" and, along with the corresponding "delta" field are adjusted at each virtual fault occurrence as follows:

$$\text{delta} := (C \text{ input} - \text{AMPPF})/8$$

$$\text{AMPPF} := \text{AMPPF} + \text{delta}$$

When it is time to reconsider the program window size for adjustment, it is the contents of the delta fields for the respective word locations that are scanned to determine how much the program window size should be increased or decreased.

Another measurement of page fault frequency for each of the word locations of program table 47 may be the actual count of virtual page faults for that word location over some average time period. In this case, the virtual page fault count for each word location can be just that count which occurs between actual page faults.

Figure 5:
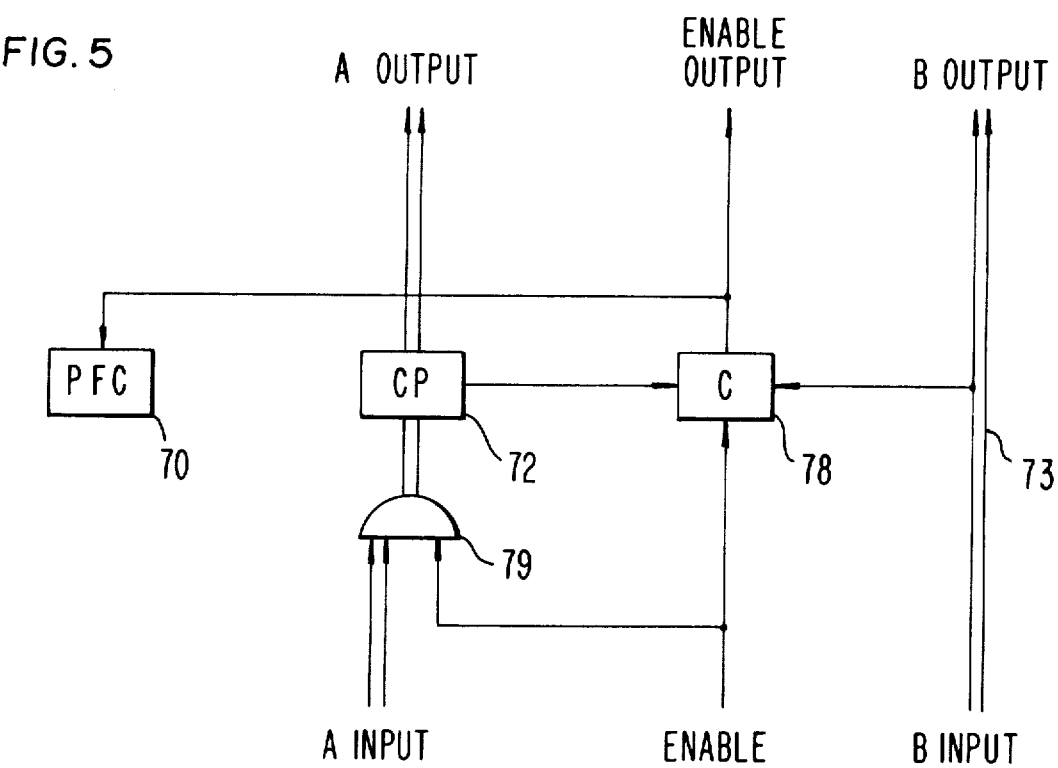
FIG. 5 is a schematic diagram of an individual word location of the program table memory of FIG. 4.

The manner in which program fault frequency count can be implemented is illustrated in FIG. 5 which is a detailed schematic of an individual word location of the program table. When a page access is requested, the page designation is placed on the B input bus and an enable signal is sent to comparator 78 of the first word location. If there is no comparison between the contents of B input bus and the current page designation of A register 72, then an enable signal is transmitted to the next successive word location and so forth. In FIG. 5, the incoming enable signal is illustrated as also activating And gate 79 to allow the transfer of the page designation from the preceding word location to present location. It will be understood, that the diagram of FIG. 5 illustrates a typical word location except for word location number 1 of program table. Word location number 1 will differ from the circuit of FIG. 5 in that the enable signal to And gate 79 will be the signal transmitted from comparator 78 rather than the enable signal from the preceding word location. Comparator 78 is just a set of AND gates arranged in two levels.

It will be apparent from FIG. 5 that if there is a comparison between the designation of the requested page and the contents of A Register 72, then no further enable signal will be transmitted and the "ripple" through the program table will stop. If there is no comparison, the "ripple" through the program table continues and the enable signal from comparator 78 is also transmitted to program fault counter 70 to increment that counter, thus indicating that a virtual page fault has occurred.

Referring again to FIG. 2, only one program table as well as one set of accumulator registers 75 and 76 has been disclosed. It will be remembered that accumulator register 75 is employed to receive the contents of CRTC counter 48 each time an actual page fault occurs. Similarly, accumulator register 76 is employed to maintain a count of the actual number of fault occurrences and is incremented each time the contents of accumulator register 75 are updated. It will further be understood that, every time the processor begins processing for a new program the contents of program table 47 as well as the accumulators 75 and 76 must be stored in memory.

While the embodiment of the present invention has been described with only one program table 47 and corresponding set of accumulator registers 75 and 76 in FIG. 2, it will be understood that a number of such program tables and accumulator registers can be provided to accommodate a number of high-priority programs. This provides the advantage that a number of programs can be run in a multiprocessing mode without any excess time delay being required to transfer the various program tables from main memory to respective words of the program table registers as would be the case where only one program table and set of registers were available.

With the mechanism thus described, the ratio of computation time C for a processor of FIG. 2 to the data transfer time T for the I/O control unit of FIG. 3 can now be computed and the program window size for the current program can be redesignated for appropriate adjustment by scanning the respective time duration between faults field or the page fault frequency field of the program table of either FIG. 4 or FIG. 5. At periodic intervals, at least twenty times the transfer time required for the I/O control unit to transfer a program page from the backup storage to main memory, the contents of the respective accumulator registers 75 and 76 of FIG. 2 are transferred to ALU 46 of FIG. 2 for computing the ratio C/T. If that ratio is greater than 1, then the program table of FIG. 4 is interrogated to determine the duration between faults count or page fault frequency for the next word location closer to the beginning of the table and so forth until a sufficiently high page fault frequency is found and the program window size then can be limited to the page frames corresponding to the word locations having that or higher frequency. If the computed ratio C/T is less than 1, then the word locations farther from the beginning of the program table are interrogated to find a word location with a sufficiently lower page fault frequency and again the program window size is upwardly adjusted. It may be that no such lower frequency exists; however it is still possible to reduce the program window size without increasing the page fault frequency and, to this end, the program table of FIG. 4 is interrogated at those word locations successively closer to the beginning of the table.

The manner in which the program window size is varied is controlled by the master control program or operating system for the data processing system of FIG. 1. This operating system manages the memory space allocated for the resources required for each of the programs that are to be concurrently run by the data processing system. If a variation of the program window size is indicated, then the operating system is to provide the appropriate increase or decrease in available memory space for that program. When the program window size for a given program is increased, this may result in a reduction of the program window size for some other program with a resultant load shedding for the affected program.

EPILOGUE

As thus described, the system and method of the present invention are directed toward a data processing system employing virtual memory. The present invention is directed toward the management of the processor and the channel which provides data transfer between the secondary storage and main memory of the system. Optimum usage of these resources is obtained when the amount of time spent by a processor is essentially equal to the amount of time spent by the channel in transferring pages from secondary storage to main memory. This allows the processor and the channel to be active for other programs when either one is not active for the current program.

Different embodiments of the present invention have been described in detail and it will be obvious to those skilled in the art that variations and modifications may be made therein without departing from the spirit and the scope of the invention as claimed.

What is claimed is:

1. A segment replacement mechanism in a data processing system having virtual memory, said system including at least one processor unit, main memory unit, secondary memory and means to transfer information segments from said secondary memory to said main memory unit when such information segments do not reside in said main memory unit at the time of their request, said processor unit including said segment replacement mechanism, an arithmetic unit and a real time counter, said mechanism comprising:

a first plurality of registers coupled together in an order to receive designations of information segments as said segments are transferred from said secondary memory to said main memory unit and to store said designations in the order in which they are most recently received;

circuit means coupled to said first plurality of registers to retrieve a segment designation from one of said first plurality of registers and reenter it at the beginning of said order of said first plurality of registers when the corresponding information segment is requested and resides in said main memory unit, each segment designation before said retrieved segment designation in said order being transferred to the next register in said order of first plurality of registers;

said real time counter providing timing signals representing the time duration during which said processor unit is processing a process;

a second plurality of registers each coupled to said circuit means and associated with a corresponding one of said first plurality of registers, each of said second plurality of registers being coupled to said real time counter to receive timing signals therefrom each time a segment designation is transferred out of its corresponding one of said first plurality of registers, each of said second plurality of registers being coupled to said arithmetic unit to transmit the stored timing signals thereto; and a third plurality of registers each coupled to said circuit means and associated with corresponding ones of said first and second plurality of registers to receive signals from said arithmetic unit and store such signals which represent the average time duration between transfers of segment designations out of the corresponding register of said first plurality of registers as a function of the timing signals supplied to said arithmetic unit by the corresponding one of said second plurality of registers such that the numerical value of the signals stored in said third plurality of registers will approximately increase in an ascending order corresponding to the order of said first plurality of registers.

* * * * *